May 8, 1956  B. J. DOTSON  2,745,057
APPARATUS USED IN MEASURING INTERSTITIAL WATER CONTENT
AND ELECTRICAL RESISTIVITY OF UNMOUNTED CORE SAMPLES
Filed Aug. 2, 1952  3 Sheets-Sheet 1

BILLY J. DOTSON
INVENTOR.

BY Frederick E. Dumoulin
ATTORNEY

May 8, 1956 B. J. DOTSON 2,745,057
APPARATUS USED IN MEASURING INTERSTITIAL WATER CONTENT
AND ELECTRICAL RESISTIVITY OF UNMOUNTED CORE SAMPLES
Filed Aug. 2, 1952 3 Sheets-Sheet 2

BILLY J. DOTSON
INVENTOR.

BY Frederick E. Dumoulin
ATTORNEY

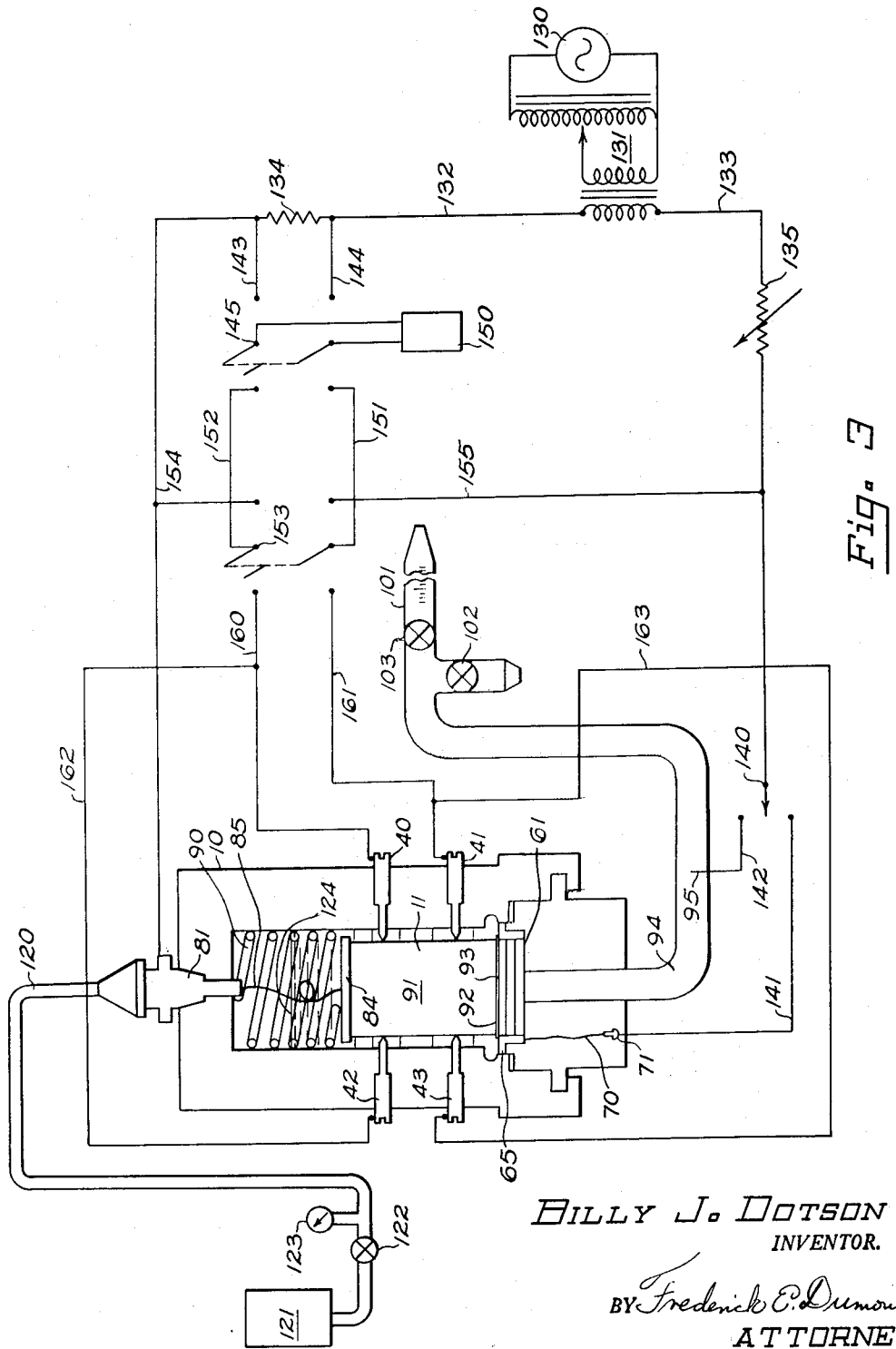

United States Patent Office 2,745,057
Patented May 8, 1956

2,745,057

APPARATUS USED IN MEASURING INTERSTITIAL WATER CONTENT AND ELECTRICAL RESISTIVITY OF UNMOUNTED CORE SAMPLES

Billy J. Dotson, Dallas, Tex., assignor, by mesne assignments, to Socony Mobil Oil Company, Inc., a corporation of New York Application August 2, 1952, Serial No. 302,374

12 Claims. (Cl. 324—13)

This invention relates to apparatus for measuring characteristics of core samples taken from wells such as oil or gas wells and relates more particularly to apparatus used in measuring the interstitial water content and electrical resistivity of such well core samples.

In the drilling of oil or gas wells, cores are taken of the earth strata through which the well is drilled and various characteristics of the cores or core samples are determined for the purpose of establishing the lithologic structure of the strata, estimating the quantity of oil or gas in the strata, the ease of flow through the strata, etc. Such cores are also taken from the producing strata and characteristics of the cores or core samples are determined for the purpose of estimating reserves, predicting production rates, etc. Among the characteristics of core samples determined for these and other purposes are the quantity of interstitial water and electrical resistivity.

The interstitial water content of core samples is generally measured indirectly by leaching and drying the core sample and, after saturating with water or brine, placing the core sample in capillary contact with a semi-permeable membrane and subjecting the core sample externally to a pressure of a fluid, the fluid being a fluid immiscible with the liquid employed for saturating the core sample. The water or brine is expelled from the core sample through the semi-permeable membrane as a result of capillary forces created by the application of the externally applied fluid pressure and when the water or brine content of the core sample arrives at a minimum the quantity of water or brine contained therein is regarded as the interstitial water content of the core sample at the fluid pressure employed. When the water or brine content of the core sample no longer decreases with increasing externally applied fluid pressure, the quantity of water or brine contained therein is regarded as the minimum interstitial water content of the core sample. For determining the interstitial water content of the core sample, the core sample is placed in a core sample holder or other suitable apparatus, and the core sample may be covered except for two faces, usually plane faces, with a solid fluid-impermeable coating, or may not be covered with such a coating.

For measurement of the electrical resistivity of the core sample, a brine must be employed for saturating the core sample and a known electrical current is passed through the core sample and the voltage drop across the entire core sample or across a selected length of the core sample is measured whereby the electrical resistivity of the core sample can be determined. It is desired to measure the electrical resistivity of the core sample at various water contents of the core sample and with the usual type of apparatus employed for measuring the interstitial water content of the core sample it is necessary to remove the core sample from the apparatus each time one of these measurements is made and thereafter to return the core sample to the apparatus to continue the measurement of interstitial water content. This procedure is tedious and time-consuming, and in addition, it cannot be presumed that, after removal of the core sample from the apparatus and consequent change in the external pressure, the core sample will attain the same state of equilibrium after being returned to the apparatus.

It is an object of this invention to provide an apparatus used in the measurement of characteristics of core samples. It is another object of this invention to provide an apparatus used in the measurment of interstitial water content of core samples. It is another object of this invention to provide an apparatus used in the measurement of electrical resistivity of core samples. It is another object of this invention to provide an apparatus used in the measurement of the interstitial water content and electrical resistivity of core samples that does not require removal of the core sample from the apparatus for measurement of its electrical resistivity. It is another object of this invention to provide a holder for a core sample during measurement of the interstitial water content and electrical resistivity of the core sample. It is another object of this invention to provide a holder for a core sample wherein measurement of electrical resistivity of the core sample may be made simultaneously with measurement of interstitial water content of the core sample. These and other objects of this invention will become apparent from the following description thereof.

Figure 3 is a schematic diagram of the apparatus of Figure 1 as used in measurement of the interstitial water content and electrical resistivity of the core sample.

In the figures, similar parts are referred to by the same numeral.

Figure 1:
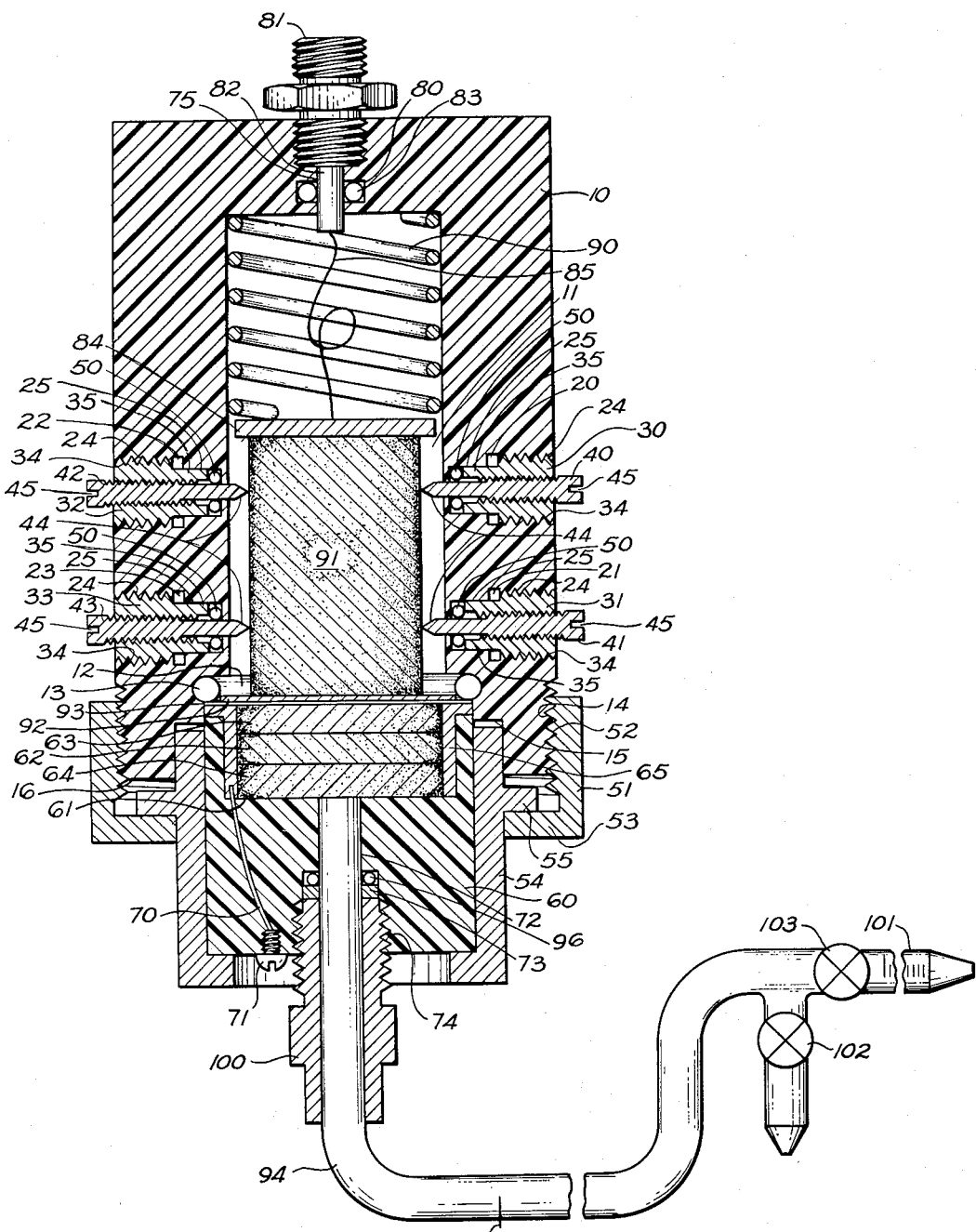
Figure 1 is a sectional view of apparatus for holding a core sample whose interstitial water content and electrical resistivity are to be measured.

Referring to Figure 1, numeral 10 designates a body member hollowed interiorly to form chamber 11. The body member may be formed of any suitable, electrically non-conducting material that will resist the application of a fluid pressure imposed within the chamber 11 and the solvent action of fluids within the chamber 11 and will be substantially non-absorptive to fluids within the chamber. Preferably, however, the body member is formed of a transparent, electrical non-conductive material and a resin such as acrylate, methacrylate, or methyl methacrylate resin has been found to be satisfactory. The body member 10 is shaped to form a gasket recess 12 and an O-ring gasket 13 is positioned within the recess 12. The lower portion of the body member is threaded exteriorly to provide threads 14 and is shaped to form shoulders 15 and 16.

Four electrode ports 20, 21, 22, and 23 are provided in the wall of the body member 10, each electrode port having a threaded portion 24 of relatively large diameter and an unthreaded portion 25 of relatively small diameter. Electrode ports 20 and 21 are positioned directly opposite electrode ports 22 and 23 and electrode ports 20 and 22 are spaced laterally from electrode ports 21 and 23. Positioned in electrode ports 20, 21, 22, and 23, respectively, are bushings 30, 31, 32, and 33, each bushing having a threaded portion 34 of relatively large diameter cooperating with threaded portions 24 of the electrode ports and an unthreaded portion 35 of relatively small diameter fitting into unthreaded portions 25 of the electrode ports. Each bushing is provided with a slot (not shown) to receive a tool for turning the bushings. Fitting into bushings 30, 31, 32, and 33, respectively, are electrodes 40, 41, 42, and 43. Each electrode is threaded and is provided with a tapered portion 44 and with a slot 45 to receive a tool for turning the electrodes. Fitting into each unthreaded portion 25 of the electrode ports and surrounding the electrodes is an O-ring gasket 50.

A collar 51 having interior threads 52 to cooperate with threads 14 and having an inwardly projecting lip 53 fits over the lower portion of the body member 10. A cylindrical member 54 provided with outwardly projecting lip 55 fits into the lower portion of the chamber 11, the cylindrical member being maintained in its position within the chamber 11 by means of collar 51, the inwardly projecting lip 53 of the collar contacting the outwardly projecting lip 55 of the cylindrical member. Fitting into cylindrical member 54 is a block member 60 in which is embedded a semi-permeable membrane 61. The cylindrical member 54 is preferably made of a metal, such as brass, and the block member 60 is made of an electrically non-conducting plastic material, such as polytrifluorochloroethylene, having resistance to chemical attack and low absorptivity to water. It will be seen that cylindrical member 54 and block member 60 provide a closure for chamber 11.

The semi-permeable membrane preferably comprises a layer 62 of powdered talc positioned between two unitary disks 63 and 64 of unglazed porcelain, as disclosed and claimed in the copending application of Frank A. Angona, Serial No. 783,508, filed November 1, 1947, now Patent No. 2,612,036. However, any type of semi-permeable membrane may be employed. Holding the disks in position with respect to each other and confining the layer of powdered talc is a metal ring 65. The metal ring, as will appear hereinafter, acts as an electrode and connnected to the metal ring 65 is a wire 70 leading to a machine screw 71 for electrical conductivity between the ring and the screw. Leading through the block member 60 to the face of the disk 64 of the semi-permeable membrane is channel 72, the channel being widened at a portion thereof to form gasket groove 73 and at another portion thereof to form threads 74.

The semi-permeable membrane 61 may be made up and imbedded in the block member 60 by soldering or otherwise fastening wire 70 to metal ring 65, placing the ring into the bottom of a mold of proper shape and dimensions, inserting into the ring the disk 63, placing a layer of powdered talc over the disk, inserting into the ring over the layer of powdered talc the disk 64, filling the mold with a plastic, such as polytrifluorochloroethylene, in powder form, positioning the wire 70 in the powdered plastic so that the unattached end will be at the surface of the plastic, and applying heat and pressure to soften the plastic and cause it to conform to the shape of the mold and to bind the metal ring and the semi-permeable membrane into the cylinder of plastic. After cooling, the assembly is taken from the mold, the channel 72 drilled therein, the gasket groove 73 is formed, and the threads 74 are cut. A hole is drilled into the plastic at the surface where the wire 70 extends, and machine screw 71 is fitted into the hole to contact the wire.

Channel 75 is formed in the body member 10, the channel being widened at one portion to form gasket groove 80 and at the portion nearest to the surface of the body member to receive metal pipe fitting 81. Metal nipple 82 is connected to the fitting 81 and extends through the channel 75 for a short distance into the chamber 11. An O-ring gasket 83 is positioned within gasket groove 80. Current electrode 84, comprising a flat metal plate, is connected electrically to nipple 82 by means of wire 85 and spiral spring 90 is positioned in the chamber between electrode 84 and nipple 82.

In operation, a core sample 91 is positioned within the chamber 11, the upper surface of the core sample making electrical contact with the electrode 84. The lower surface, for the entire area thereof, is contacted with the semi-permeable membrane 61. However, in order to increase capillary contact with the semi-permeable membrane, it is preferred to position pad 92 of soft, porous paper between the core and the semi-permeable membrane. Thin sheet 93 of "cellophane" covering the entire upper surface of disk 63 is positioned between the pad 92 and the upper surface of disk 63 in the event the fluid pressure to be employed within the chamber 11 exceeds the displacement pressure of semi-permeable membrane 61. Tube 94 containing tungsten wire 95 sealed through the side thereof is positioned in channel 72, O-ring gasket 96 being placed in gasket groove 73 and threaded bushing 100 being fitted into the threaded portion of channel 72, the threads on the bushing cooperating with the threads 74. The tube 95 terminates in pipette 101. Valve 102 is positioned in a drain tube connected to tube 94 and valve 103 is positioned in tube 95 before the pipette.

For measurement of the interstitial water content and electrical resistivity of core samples, it is customary to use as large a core sample as is practicable in order to obtain a sufficiently accurate determination by reducing errors encountered in measuring small quantities. Further, the core sample should be cut into a well defined geometrical shape for purposes of determining electrical resistivity and of easy handling and accommodation in the measuring apparatus. Core samples cut into cylinders having lengths from ⅞-inch to three inches and diameters from about ½-inch to one inch are considered satisfactory.

In carrying out the measurements on the core sample, the core sample is first treated to remove oil or other liquid material contained therein. This may be accomplished by extracting the core sample with a suitable solvent such as acetone, benzene, toluene, etc., and the extraction may be carried out in a Soxhlet extractor or other suitable type of apparatus. Following extraction, the core sample is thoroughly dried of all solvent, as for example, by heating in a drying oven at about 100° C. After cooling, the physical dimensions of the core sample are measured. The pore volume of the core sample is also measured employing any suitable method and apparatus.

The dried core sample is weighed and thereafter is saturated with brine. Where practically complete saturation is desired, it is preferred to first remove the air from the core sample, and this may be done simply by subjecting the core sample to a reduced pressure in a suitable type of evacuator. Thereafter, the core sample may be saturated at higher pressure with an inert water-soluble gas such as carbon dioxide. This procedure of evacuating followed by saturating with an inert water-soluble gas may be repeated as often as necessary to insure the removal and replacement of the maximum amount of air practically obtainable. Usually, three cycles will be satisfactory. The gas saturated core sample is evacuated once again and, while under the reduced pressure, brine is admitted to it. The water-soluble gas remaining in the core sample dissolves in the brine thereby effecting a satisfactorily complete saturation. Saturation of the core sample may also be effected by subjecting the core sample to a reduced pressure in a suitable type of evacuator and while maintaining the core sample at the reduced pressure admitting the brine thereto, the brine previously having been de-aerated, as by boiling.

Adherent external brine is wiped or drained from the core sample and the saturated core sample is weighed. The difference between the weight of the dry core sample and the weight of the saturated core sample will be the amount of brine absorbed. Knowing the density of the brine, the volume of brine in the pore spaces of the core sample may then be calculated from the expression $$V = \frac{W}{d}$$

where V is the volume of the brine in the pore spaces of the core sample, W is the weight of the absorbed brine, and $d$ is the density of the brine.

Desirably, the liquid employed for saturating the core sample should have the same physical properties such as surface tension, salinity, etc., as the aqueous liquid in the underground formation from which the core sample was taken. These properties may be determined by analysis of a sample of the liquid contained in the formation and a liquid having these same properties may be readily prepared by those skilled in the art. For all practical purposes, however, a brine consisting of sodium chloride and water is satisfactory. The sodium chloride content of the brine may be between 1000 and 100,000 parts per million although higher and lower sodium chloride content may be employed as desired. A brine having a sodium chloride content of 50,000 parts per million gives satisfactory results. Where comparison of the resistivity of a plurality of core samples as made, the same type of brine is employed for saturating each core sample.

The semi-permeable membrane with which the core sample is maintained in capillary contact during measurement of interstitial water content is saturated with the same type of brine employed for saturating the core sample. The semi-permeable membrane may be saturated by the same procedures described above in connection with the saturation of the core sample.

For imposing the pressure on the core sample for measurement of interstitial water content, a second phase, immiscible with the phase employed for saturating the core sample and semi-permeable membrane, is employed. Gases such as air, nitrogen, oxygen, light hydrocarbons, etc., and liquids such as crude petroleum oil, gas oil, mineral seal oil, kerosene, isooctane, etc., may be employed.

The minimum interstitial water content or some intermediate interstitial water content of the core sample may be determined. The minimum interstitial water content as measured will be the water content of the core sample at the point where further increase in the fluid pressure imposed on the core sample no longer results in removal of brine from the core sample. The pressures employed may be as high as desired but a limiting factor will be imposed by the displacement pressure of the semi-permeable membrane, i. e., the pressure at which the membrane saturated with one phase will become permeable to another phase. The use of a thin sheet of "cellophane," as mentioned hereinabove, makes possible the use of higher fluid pressures within the chamber 11 since its displacement pressure is higher than that of semi-permeable membrane 61. Pressures employed will be moderate and may be, for example, 5 to 60 pounds per square inch.

The interstitial water content may be expressed as the percentage of the total pore volume occupied by the interstitial water. Knowing the volume of brine removed under the influence of the pressure and the volume of brine in the core sample at saturation, the amount remaining may be obtained by subtraction. From this figure, knowing the density of the brine, the pore volume occupied by the brine may be calculated in the same manner as explained hereinabove for calculation of the total pore volume. The ratio of the pore volume occupied by the interstitial water to the total pore volume multiplied by 100 will give the desired figure.

Measurement of the electrical resistivity of the core sample may be made with the apparatus of the invention at any time during measurement of interstitial water content and simultaneously therewith. The measurement involves passing a known electrical current through the core sample and determining the resulting potential drop. Knowing the value of the current and the potential drop, the resistance at the existing temperature is obtained by application of Ohm's law. With the resistance determined, the resistivity can be calculated from the geometry of the core sample by the relationship $$\rho = R\frac{A}{L}$$

where $\rho$ is the resistivity of the core sample, R is the measured resistance between electrodes, A is the cross-sectional area of the core sample, and L is the distance between the electrodes employed in measuring the resistance.

In carrying out measurement of interstitial water content and electrical resistivity of a core sample, the core sample, after cleaning, weighing, saturating with brine, and reweighing, is placed into the chamber 11 of the apparatus with electrode 84 flat against the face of the core sample. The core sample is placed sufficiently far into the chamber so that when semi-permeable membrane 61 is placed into the chamber, there will be a gap of at least $\frac{1}{16}$ to $\frac{1}{8}$-inch between the face of the core sample and the semi-permeable membrane. The core sample is then secured in this position by tightening one or more of electrodes 40, 41, 42, and 43 against the core sample. Gasket 13 being in place in gasket groove 12, and semi-permeable membrane 61 having been saturated with brine, "cellophane" sheet 93, if used, and pad 92 of porous paper are placed flat against the face of disk 63, and the block member 60 and the associated semi-permeable membrane are inserted into the chamber 11. Cylindrical member 54 is positioned to receive the block member 60 and collar 51 is fitted over the cylindrical member 54 and screwed onto the body member 10 and tightened. Bushings 30, 31, 32, and 33 are also tightened just sufficiently against gaskets 50 to prevent leaks. Gasket 96 is positioned in gasket groove 73, bushing 100 is inserted into channel 72, and, with the apparatus inverted, tube 94, filled entirely with the same type of solution employed for saturating the core sample and semi-permeable membrane, is fitted into the center part of the bushing so that the tube contacts the face of disk 64. The bushing is tightened sufficiently against the gasket 96 to prevent leaks and the apparatus turned to its original position. Where a liquid is to be employed as the fluid phase imposing pressure on the core sample, the liquid may be introduced into the chamber 11 through the fitting 81 and a sufficient quantity is employed to fill the chamber to a level well above the core.

Referring now to Figure 3, fitting 81 is connected to line 120 leading to reservoir 121 of fluid under pressure, the line 120 being provided with pressure regulating valve 122 and pressure gauge 123 for controlling the pressure in line 120 at a desired value. The fluid in reservoir 121 may be the same liquid as the liquid placed in chamber 11 or may be a gas or liquid immiscible therewith. Where a gas is to be employed for imposing pressure on the core sample, the step described above of placing liquid in the chamber will, of course, be omitted and the gas for imposing the pressure on the core sample will be supplied from the reservoir 121. Stopcock 103 being open, valve 122 is operated to impose a pressure of about one pound per square inch gauge in the chamber 11 to remove excess brine from the pad 92, which brine flows through the semi-permeable membrane to tube 94. When all excess brine is removed, as indicated by cessation of flow of brine through or from the end of pipette 101, any of electrodes 40, 41, 42, or 43 previously tightened to hold the core sample in position away from the semi-permeable membrane are loosened allowing spring 90 to force the core sample 91 tightly against the pad 92. The electrodes 40, 41, 42, and 43 are then tightened until they firmly contact the core sample.

Stopcock 102 is opened to drain sufficient brine from the pipette 101 so that the liquid brine face will be located at the zero or other selected mark on the pipette and the stopcock is then closed. Pressure regulator valve 122 is operated to impose upon the liquid 124 in the chamber the pressure at which the interstitial water content of the core sample is to be measured. By reason of the pressure on the core sample, brine passes from the core sample through the semi-permeable membrane and thence through tube 94 to pipette 101. The process is slow, sometimes requiring a number of days until the interstitial water content of the core comes to equilibrium at the pressure employed and until equilibrium is established, the volume of brine in the pipette increases, finally remaining stationary at equilibrium. Where the volume of the pipette is not sufficiently great to accommodate the total amount of brine removed from the core sample, measured amounts of brine may be drained from the pipette through stopcock 102. The volume of interstitial water in the core sample at equilibrium may be calculated by subtracting the increase in the amount of brine in the pipette from the known volume of brine in the core sample at saturation previously determined by weighing.

Electrical resistivity of the core sample may be measured at saturated water content or at equilibrium water content, or at any water content between saturation and equilibrium. The resistivity may be measured across the entire core sample or may be measured across a portion of the core sample. Still referring to Figure 3, a source 130 of alternating current is connected to variable transformer 131 and conductors 132 and 133 are connected to the transformer. Conductor 132 contains known fixed resistor 134 and is connected to fitting 81; and conductor 133 contains variable resistor 135 and leads to single-pole, double-throw switch 140. One pole of switch 140 is connected to conductor 141 leading to machine screw 71 and the other pole is connected to conductor 142 leading to wire 95. Conductors 143 and 144 lead to double-pole, double-throw switch 145, the center poles of which lead to voltage measuring device 150 having a high impedance. Conductors 151 and 152 lead from switch 145 to the center poles of double-throw, double-pole switch 153. One set of poles of switch 153 are connected to conductors 154 and 155 leading to conductors 132 and 133, respectively, and the other set of poles is connected to conductors 160 and 161 leading to electrodes 40 and 41, respectively. Connected to conductor 160 is conductor 162 leading to electrode 42 and connected to conductor 161 is conductor 163 leading to electrode 43.

To measure the conductivity across the entire core, switch 153 is opened, switch 145 is closed to its right hand position to connect conductors 143 and 144 to the voltage measuring device 150, and switch 140 is closed to connect conductor 133 with either conductor 141 or 142. When switch 140 is closed to connect conductor 133 with conductor 142 and wire 95, the brine in tube 94 between conductor 142 and semi-permeable membrane 61 will be part of the circuit and will provide a resistance of its own. However, where the brine is sufficiently concentrated, this resistance will be negligible compared to the resistance of the core sample and may be neglected. On the other hand, if the resistance of the brine in the tube 94 is not negligible, correction may be made therefor from knowledge of the cross sectional area of the tube and the distance between wire 95 and semi-permeable membrane 61. While the use of wire 95 introduces a problem of correction of resistance, or the use of sufficiently concentrated brine to eliminate the need for correction, its use will avoid the necessity for provision of wire 70. Current from source 130 is then passed through the circuit thus formed, the circuit consisting of transformer 131, conductor 132, resistor 134, fitting 81, wire 85, electrode 84, core sample 91, pad 92, cellophane sheet 93, the ring 65 around semi-permeable membrane 61, either wire 70, screw 71, and conductor 141 or the brine in tube 94, wire 95, and conductor 142, switch 140, resistor 135, and conductor 133. The value of resistor 134 being known, transformer 131 and variable resistor 135 are adjusted to obtain a desired current through the circuit as measured by voltage measuring device 150 connected across known resistor 134. Switch 145 is thrown to its left hand position to connect conductors 151 and 152 to the voltage measuring device and switch 153 is thrown to its right hand position to connect conductors 154 and 155, respectively, to conductors 152 and 151.

The voltage measuring device now measures the potential drop across the core sample 91. Knowing the current and the potential drop, the resistance of the core sample is calculated by application of Ohm's law. The value of the resistivity can then be calculated from the resistance and the geometry of the core sample.

Measurement of the resistivity across the entire core sample may introduce uncertainties as to contact resistances between the core sample and the electrode 84 and the core sample and the pad, the sheet of cellophane, and the ring 65. Further, where the resistivity of core samples having unequal, although slightly unequal, lengths, but equal diameters, is measured, it may be desired to eliminate measurement of the length of the core samples. In these cases, the resistivity of the core samples may be measured along a portion of their lengths, the portion being the known distance between the points of contact of electrodes 40 and 42 and the points of contact of electrodes 41 and 43. Resistance of the core sample between the points of contact of electrodes 40 and 42 and the points of contact of electrodes 41 and 43 is measured by throwing switch 153 to its left hand position to connect conductors 160 and 161 to the voltage measuring device 150 through conductors 152 and 151, respectively. The reading on the voltage measuring device will indicate the resistance of the core sample between the points of contact of the electrodes in the same manner as described above for the entire core sample.

It will be observed from inspection of Figure 1 that, since the position of membrane 61 against gasket 13 is fixed, irrespective of the length of the core sample the same portion of each core sample with respect to its distance from the top and bottom face will be positioned between the electrodes 42 and 43 and the electrodes 41 and 42. It may be desired to position the core sample in the chamber 11 otherwise than as fixed by the position of membrane 61 against gasket 13, and in such cases, the apparatus of Figure 2 may be employed.

Figure 2:
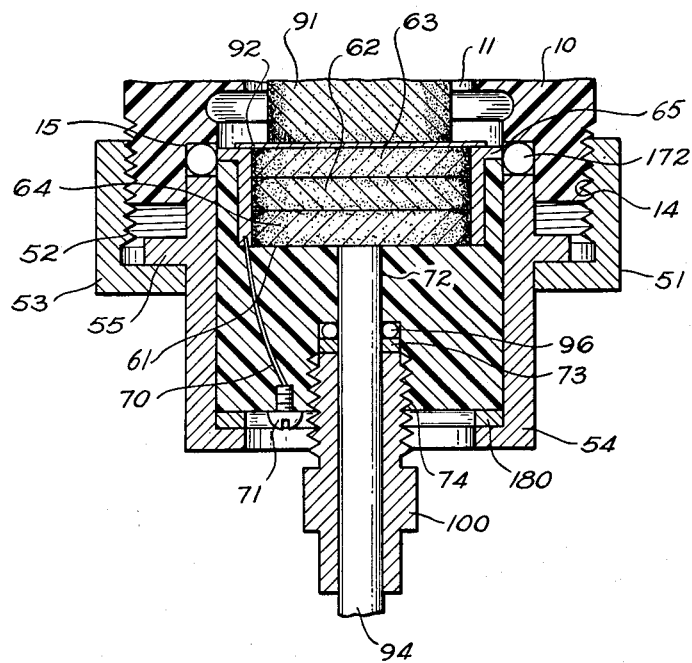
Figure 2 is a sectional view of another form of a portion of the apparatus of Figure 1.

Referring to Figure 2, O-ring gasket 172 is positioned in chamber 11 against shoulder 15 of body member 10, and positioned between block member 60 and the cylindrical member 54 is spacer ring 180.

Spacer ring 180 will have a thickness necessary to position core sample 91 in the chamber 11 as desired; and various spacer rings with different thicknesses may be provided. With a thick spacer ring, the core sample will enter further into the chamber 11 than with a thin spacer ring and the thickness of the spacer ring required to obtain a desired position of any core sample with respect to the electrodes may be determined from measurement of the length of the core sample or by trial and error, assembling the apparatus employing spacer rings of different thicknesses until the desired position of the core sample in the chamber is obtained.

Assembly of the apparatus of Figure 2 is effected similarly as assembly of the apparatus of Figure 1.

Having thus described my invention, it will be understood that such description has been given by way of illustration and example and not by way of limitation, reference for the latter purpose being had to the appended claims.

I claim:

1. Apparatus of the character described comprising in combination a body member containing a chamber therein for receiving a core sample and having an opening thereto, means for introducing a fluid into said chamber, an electrode in said chamber, resilient means within said chamber, a closure for said chamber contacting said body member, means for retaining said closure in contact with said body member, a semi-permeable membrane contacting said closure, one surface of said semi-permeable membrane facing said chamber, an electrode contacting said semi-permeable membrane, fluid conducting means passing through said closure and leading to said semi-permeable membrane, electrical conductor means leading to said first mentioned electrode, and electrical conductor means leading to said second mentioned electrode.

2. Apparatus of the character described comprising in combination a body member containing a chamber therein for receiving a core sample and having an opening thereto, means for introducing a fluid into said chamber, an electrode in said chamber, resilient means within said chamber, a ring member contacting said body member at said opening to said chamber, a block member fitting within said ring member, a semi-permeable membrane contacting said block member, one face of said semi-permeable membrane facing said chamber, an electrode contacting said semi-permeable membrane, means for retaining said ring member in its position contacting said body member at said opening to said chamber, fluid conducting means passing through said block member and leading to said semi-permeable membrane, electrical conductor means leading to said first mentioned electrode, and electrical conductor means leading to said electrode contacting said semi-permeable membrane.

3. Apparatus of the character described comprising in combination a body member containing a chamber therein for receiving a core sample and having an opening thereto, means for introducing a fluid into said chamber, a first electrode in said chamber adapted to contact a core sample in said chamber, a ring member contacting said body member at said opening to said chamber, a block member fitting within said ring member, a semi-permeable membrane contacting said block member and positioned with respect thereto to contact a core sample in said chamber, resilient means within said chamber adapted to hold a core sample between said first electrode and said semi-permeable membrane, a second electrode contacting said semi-permeable membrane and adapted to contact a core sample in said chamber, means for retaining said ring member in its position contacting said body member at said opening to said chamber, fluid conducting means passing through said block member and leading to said semi-permeable membrane, electrical conductor means leading to said first electrode, and electrical conductor means leading to said second electrode.

4. Apparatus of the character described comprising in combination a body member containing a chamber therein adapted to receive a core sample and having an opening thereto, means for introducing a fluid into said chamber, a first electrode in said chamber adapted to contact a core sample in said chamber, a ring member contacting said body member at said opening to said chamber, a block member fitting within said ring member, a semi-permeable membrane contacting said block member and positioned with respect thereto to contact a core sample in said chamber, resilient means within said chamber adapted to hold a core sample between said first electrode and said semi-permeable membrane, a second electrode contacting said semi-permeable membrane and adapted to contact a core sample in said chamber, means for retaining said ring member in its position contacting said body member at said opening to said chamber, fluid conducting means passing through said block member and leading to said semi-permeable membrane, electrical conductor means leading to said first electrode, electrical conductor means leading to said second electrode, and a plurality of electrode means leading through said body member and adapted to contact a core sample within said chamber.

5. Apparatus of the character described comprising in combination a body member containing a chamber therein for receiving a core sample and having an opening thereto, means for introducing a fluid into said chamber, a first electrode in said chamber adapted to contact a core sample in said chamber, a ring member contacting said body member at said opening to said chamber, a block member fitting within said ring member, a semi-permeable membrane contacting said block member and positioned at least partially within said chamber, a spring within said chamber adapted to hold a core sample between said first electrode and said semi-permeable membrane, a second electrode contacting said semi-permeable membrane and adapted to contact a core sample in said chamber, a collar member encircling said ring member and said body member and adapted to retain said ring member in its position contacting said body member at said opening to said chamber, fluid conducting means passing through said block member and leading to said semi-permeable membrane, an electrical conductor leading from said first electrode to without said body member, an electrical conductor leading from said second electrode to without said block member, and a plurality of electrodes leading through said body member and adapted to contact a core sample within said chamber.

6. Apparatus of the character described comprising in combination a body member containing a chamber therein for receiving a core sample and having an opening thereto, means for introducing a fluid into said chamber, a first electrode in said chamber adapted to contact a core sample in said chamber, a ring member contacting said body member at said opening to said chamber, a block member fitting within said ring member, a semi-permeable membrane contacting said block member and positioned at least partially within said chamber, a spring within said chamber contacting said first electrode, a second electrode contacting said semi-permeable membrane and adapted to contact a core sample in said chamber, a collar member encircling said ring member and said body member and adapted to retain said ring member in its position contacting said body member at said opening to said chamber, fluid conducting means passing through said block member and leading to said semi-permeable membrane, an electrical conductor leading from said first electrode to without said body member, an electrical conductor leading from said second electrode to without said block member, a pair of electrodes leading through said body member at opposite sides thereof and adapted to contact a core sample within said chamber, and a second pair of electrodes leading through said body member at opposite sides thereof and adapted to contact a core sample within said chamber, said pairs of electrodes being spaced laterally from each other.

7. Apparatus for measuring interstitial water content and electrical resistivity of a core sample comprising in combination a body member containing a chamber therein for receiving a core sample and having an opening thereto, means for introducing a fluid into said chamber, a source of fluid under pressure connected to said last named means, an electrode in said chamber, resilient means within said chamber, a closure for said chamber contacting said body member, means for retaining said closure in contact with said body member, a semi-permeable membrane contacting said closure, one surface of said semi-permeable membrane facing said chamber, an electrode contacting said semi-permeable membrane, fluid conducting means passing through said closure and leading to said semi-permeable membrane, fluid measuring means connected to said last mentioned means, a source of electrical current connected to said first mentioned electrode and said electrode contacting said semi-permeable membrane, and means connected to said electrodes for measuring electrical potential therebetween.

8. Apparatus for measuring interstitial water content and electrical resistivity of a core sample comprising in combination a body member containing a chamber therein adapted to receive a core sample, means for introducing a fluid into said chamber, a source of fluid under pressure connected to said last named means, a first electrode in said chamber adapted to contact a core sample in said chamber, a closure for said chamber contacting said body member, means for retaining said closure in contact with said body member, a semi-permeable membrane contacting said closure and adapted to contact a core sample in said chamber, resilient means within said chamber adapted to hold a core sample between first said electrode and said semi-permeable membrane, a second electrode contacting said semi-permeable membrane and adapted to contact a core sample in said chamber, fluid conducting means passing through said closure and leading to said semi-permeable membrane, fluid measuring means connected to said last mentioned means, a source of electrical current connected to said first electrode and said second electrode, a plurality of electrodes passing through said body member and adapted to contact a core sample within said chamber, and means connected to said electrodes for measuring electrical potential therebetween.

9. Apparatus for measuring interstitial water content and electrical resistivity of a core sample comprising in combination a body member containing a chamber therein adapted to receive a core sample and having an opening thereto, means for introducing a fluid into said chamber, a source of fluid under pressure connected to said last named means, a first electrode in said chamber adapted to contact a core sample in said chamber, a ring member contacting said body member at said opening to said chamber, a block member fitting within said ring member, a semi-permeable membrane contacting said block member and positioned with respect thereto to contact a core sample in said chamber, resilient means within said chamber adapted to hold a core sample between said first electrode and said semi-permeable membrane, a second electrode contacting said semi-permeable membrane and adapted to contact a core sample in said chamber, means for retaining said ring member in its position contacting said body member at said opening to said chamber, fluid conducting means passing through said closure and leading to said semi-permeable membrane, fluid measuring means connected to said last mentioned means, a source of electrical current connected to said first electrode and said second electrode, a pair of electrodes leading through said body member at opposite sides thereof and adapted to contact a core sample within said chamber, a second pair of electrodes leading through said body member at opposite sides thereof and adapted to contact a core sample within said chamber, said pairs of electrodes being laterally spaced from each other, and means for measuring electrical potential between each of said pairs of electrodes.

10. Apparatus of the character described comprising in combination a body member containing a chamber therein for receiving a core sample and having an opening thereto, means for introducing a fluid into said chamber, an electrode in said chamber, resilient means within said chamber, a ring member contacting said body member at said opening to said chamber, a block member fitting within said ring member, a semi-permeable membrane contacting said block member, one face of said semi-permeable membrane facing said chamber, an electrode contacting said semi-permeable membrane, means for retaining said ring member in its position contacting said body member at said opening to said chamber, fluid conducting means passing through said block member and leading to said semi-permeable membrane, electrical conductor means leading to said first mentioned electrode, electrical conductor means leading to said electrode contacting said semi-permeable membrane, and a plurality of electrode means leading through said body member and adapted to contact a core sample when placed within said chamber.

11. Apparatus of the character described comprising in combination a body member containing a chamber therein for receiving a core sample and having an opening thereto, means for introducing a fluid into said chamber, a first electrode in said chamber adapted to contact a core sample in said chamber, a ring member contacting said body member at said opening to said chamber, a block member fitting within said ring member, a semi-permeable membrane contacting said block member and positioned with respect thereto to contact a core sample in said chamber, resilient means within said chamber adapted to hold a core sample between said first electrode and said semi-permeable membrane, a second electrode contacting said semi-permeable membrane, means for retaining said ring member in its position contacting said body member at said opening to said chamber, fluid conducting means passing through said block member and leading to said semi-permeable membrane, electrical conductor means leading to said first electrode, and electrical conductor means leading to said second electrode.

12. Apparatus of the character described comprising in combination a body member containing a chamber therein for receiving a core sample and having an opening thereto, means for introducing a fluid into said chamber, a first electrode in said chamber adapted to contact a core sample when placed within said chamber, a ring member contacting said body member at said opening to said chamber, a block member fitting within said ring member, a semi-permeable membrane contacting said block member and positioned with respect thereto to contact a core sample when placed within said chamber, resilient means within said chamber adapted to hold between said first electrode and said semi-permeable membrane a core sample when placed within said chamber, a second electrode contacting said semi-permeable membrane, means for retaining said ring member in its position contacting said body member at said opening to said chamber, fluid conducting means passing through said block member and leading to said semi-permeable membrane, electrical conductor means leading to said first electrode, and electrical conductor means leading to said second electrode.

References Cited in the file of this patent

UNITED STATES PATENTS

| 2,195,504 | Stone | Apr. 2, 1940 |
| 2,437,935 | Brunner et al. | Mar. 16, 1948 |
| 2,534,737 | Rose | Dec. 19, 1950 |
| 2,539,355 | Reichertz | Jan. 23, 1951 |
| 2,583,284 | Wyllie et al. | Jan. 22, 1952 |
| 2,613,250 | Bilhartz et al. | Oct. 7, 1952 |